United States Patent
Kang

(10) Patent No.: US 10,732,158 B2
(45) Date of Patent: Aug. 4, 2020

(54) INTEGRATED HIGH-THROUGHPUT METHODS TO CHARACTERIZE MULTI-COMPONENT POLYMERS

(71) Applicant: ExxonMobil Chemical Patents Inc., Baytown, TX (US)

(72) Inventor: Shuhui Kang, Houston, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 410 days.

(21) Appl. No.: 15/658,904

(22) Filed: Jul. 25, 2017

(65) Prior Publication Data

US 2018/0059076 A1 Mar. 1, 2018

Related U.S. Application Data

(60) Provisional application No. 62/381,663, filed on Aug. 31, 2016.

(51) Int. Cl.
*G01N 30/86* (2006.01)
*G01N 30/74* (2006.01)
(Continued)

(52) U.S. Cl.
CPC ........ *G01N 30/8682* (2013.01); *B01J 20/291* (2013.01); *G01N 30/48* (2013.01);
(Continued)

(58) Field of Classification Search
CPC ............... G01N 30/8682; G01N 30/74; G01N 2030/885; G01N 2030/065
See application file for complete search history.

(56) References Cited

U.S. PATENT DOCUMENTS 4,807,148 A * 2/1989 Lacey ................ G01N 30/8603
702/32
5,304,494 A * 4/1994 Eisenmann ........ G01N 33/2829
210/656
(Continued)

FOREIGN PATENT DOCUMENTS

WO 2006/081116 8/2006

OTHER PUBLICATIONS

Ortin, Alberto, Monrabal, Benjamin, Sancho-Tello, Juan, "Development of an Automated Cross-Fractionation Apparatus (TREF-GPC) for a Full Characterization of the Bivariate Distribution of Polyolefins", Macromolecular Symposia, vol. 257, Issue 1, 2007. https://doi.org/10.1002/masy.200751102 (Year: 2007).*

(Continued)

*Primary Examiner* — Benjamin R Whatley
*Assistant Examiner* — Jean Caraballo-Leon
(74) *Attorney, Agent, or Firm* — Kevin M. Faulkner

(57) ABSTRACT

A method of analyzing a multi-component polymer comprising: (a) dissolving an multi-component polymer having a primary monomer and primary comonomer to form a first volume (soluble portion of multi-component polymer); (b) injecting a portion of the first volume into a chromatographic column to get elution first slices, leaving a second volume behind; (c) filtering the second volume to isolate multi-component polymer solids; (d) dissolving solids to form solution third solution (insoluble portion of multi-component polymer); (e) injecting a portion of third solution into the chromatographic column to get elution second slices; (f) obtain infra-red spectra at wavelengths suitable for the primary monomer and the primary comonomer of first and second elution slices, separately; and (g) for each elution slice, separately calculate: (i) the different polymer compo- (Continued)

nents (soluble and insoluble); and (ii) the comonomer content of each component (soluble and insoluble).

13 Claims, 5 Drawing Sheets

(51) Int. Cl.
*B01J 20/281* (2006.01)
*G01N 30/88* (2006.01)
*B01J 20/291* (2006.01)
*G01N 30/00* (2006.01)
*G01N 30/06* (2006.01)

(52) U.S. Cl.
CPC ............. *G01N 30/74* (2013.01); *G01N 30/88* (2013.01); *B01J 2220/54* (2013.01); *G01N 2030/065* (2013.01); *G01N 2030/486* (2013.01); *G01N 2030/885* (2013.01)

(56) References Cited

U.S. PATENT DOCUMENTS 6,265,226 B1 * 7/2001 Petro ...................... B01D 15/08
422/504
2012/0006104 A1    1/2012 Cho et al.

OTHER PUBLICATIONS

Inmaculada Suárez, M Joaquina Caballero, Baudilio Coto, "Composition effects on ethylene/propylene copolymers studied by GPC-MALS and GPC-IR", European Polymer Journal, vol. 46, Issue 1,2010. https://doi.org/10.1016/j.eurpolymj.2009.09.005. (Year: 2010).*
James L. Dwyer and Ming Zhou, "Polymer Characterization by Combined Chromatography-Infrared Spectroscopy," International Journal of Spectroscopy, vol. 2011, Article ID 694645, 13 pages, 2011. https://doi.org/10.1155/2011/694645. (Year: 2011).*
Richard M. Felder, Ronald W. Rousseau, "Elementary Principles of Chemical Processes", Book, ISBN-13:978-0471687573, 2004. (Year: 2004).*
U.S. Appl. No. 15/477,359, entitled Methods of Determining Molecular Weight and Comonomer Characteristics of a Copolymer in Polymer Blends, filed Apr. 3, 2017.
Cheruthazhekatt, S., et al. "Fractionat ion and Characterization of Impact Poly(propylene) Copolymers by High Temperature Two-Dimensional Liquid Chromatography" Macromolecular Symposia, vol. 337, pp. 51-57, 2014.
Monrabal, B. et al., "High Temperature Gel Permeation Chromatograph (GPC/SEC) with integrated IR5 MCT detector for Polyolefin Analysis: a breakthrough in sensitivity and automation", LCGC Europe Application Book, pp. 1-4, Jul. 31, 2012.

* cited by examiner

INTEGRATED HIGH-THROUGHPUT METHODS TO CHARACTERIZE MULTI-COMPONENT POLYMERS

PRIORITY CLAIM

This application claims the benefit of Provisional Application No. 62/381,663, filed Aug. 31, 2016, the disclosure of which is incorporated herein by reference.

FIELD OF THE INVENTION

The present invention relates to qualitative and quantitative methods to analyze multi-component polymers, and in particular to determining the amount of rubber or copolymer in a multi-component polymer, and its ethylene content.

BACKGROUND OF THE INVENTION

There is a desire to unravel the molecular composition of multi-component polymer systems such as, for example, propylene-based impact copolymers and other polyolefin polymer blends. Here and throughout this specification, polymer blends comprising at least two distinct polymers will be referred to as a multi-component polymer, or "MCP", and preferably is a propylene-based impact copolymer comprising a continuous propylene homopolymer phase and discontinuous domains of ethylene-propylene copolymer or rubber. In any case, the conventional rubber extraction method, which includes xylene solvent extraction in conjunction with other composition characterization techniques, has been used for decades in order to independently study the crystalline and the rubber phases of MCP. However these approaches are usually inefficient and frequently result in reproducibility issues.

PolymerChar™ Gel Permeation Chromatographs ("GPC") and other chromatographic equipment equipped with one or more band-filter based multi-channel infra-red ("IR") detectors have been demonstrated to provide a powerful technique for MCP characterization due to high detector sensitivity, simultaneous measurement of molecular weight and ethylene-derived units ("C2") of the polyolefin, and fast turnaround time. In previous studies of MCP's, a series of methodologies had been developed with GPC-IR to deconvolute the MWD (Mw/Mn, where Mw is the weight average molecular weight, and Mn is the number average molecular weight) of crystalline phase and rubber phase. However the weakness with this approach is that additional information is needed to perform the deconvolution, and the MCP is modeled as a simple binary system of a mixture of PP and EP. Recent studies have revealed that most MCP's are not a simple binary mixture of polymers and typically include more detailed structure such as atactic polypropylene and polyethylenes.

The present invention(s) introduce a more advanced method to study both the major phases and minor phases of MCP's by integrating GPC-IR characterization with simple fractionation. This method can directly provide information on the amount of EP (ethylene-propylene copolymer or rubber, and polyethylenes, PE) and the C2 levels in each without any additional information. The composition and the MWD of each phase will also be provided.

SUMMARY OF THE INVENTION

Disclosed herein is a method of analyzing an MCP comprising: (a) dissolving a MCP having a primary monomer and primary comonomer to form a volume V1 (soluble portion of MCP); (b) injecting a portion of the V1 into a chromatographic column to get elution slices E1, leaving a volume V2 behind; (c) filtering V2 to isolate MCP solids Mp; (d) dissolving solids Mp to form solution V3 (insoluble portion of MCP); (e) injecting a portion of V3 into the chromatographic column to get elution slices E3; (f) obtain IR spectra at wavelengths suitable for the primary monomer and the primary comonomer of E1 and E3, separately; and (g) for each elution slice E1 and E3, separately calculate: (i) the different polymer components (soluble and insoluble); and (ii) the comonomer content of each component (soluble and insoluble).

DETAILED DESCRIPTION

Figure 1:
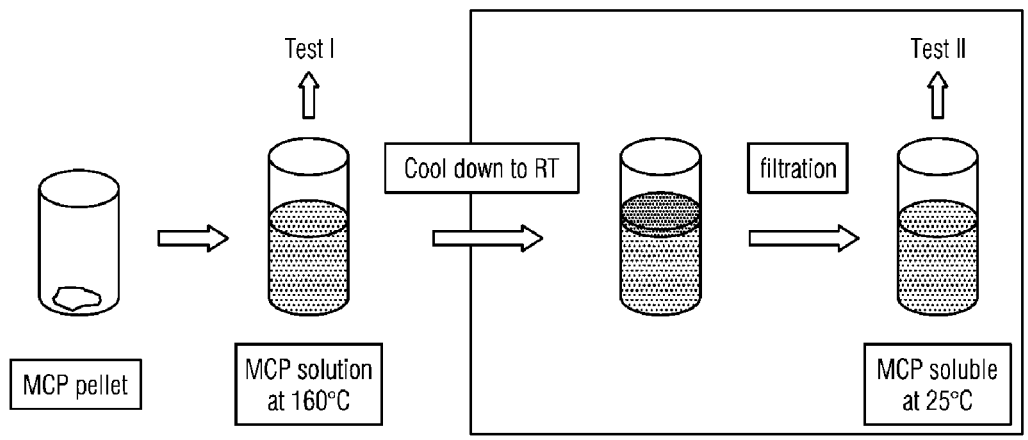
FIG. 1 is a diagram for the GPC-IR test procedure used in the advanced characterization method described here, where Test I is the normal test with MCP dry polymer, and Test II is the additional test for the soluble part of MCP solution cooled down to 25° C.

The invention(s) described herein are achieved by combining advanced instrument features and proper experimental design with realistic assumptions on MCP composition and the mathematical relationship among the associated variables. In the standard GPC-IR test procedure provided by many vendors, a sample is only tested once. The sample solution following the test is treated as waste and discarded. As described herein, the sample solution is not discarded as waste but reused for a second test. When the solution is delivered to the auto-sampler tray and cooled down to 25° C., it is naturally fractionated into a soluble portion and insoluble portion. The insoluble portion can be removed with a filter paper or other filtration device and the soluble portion can be collected as the sample for a second test. This new test procedure is outlined in FIG. 1.

Studies on MCP suggests that there are at least five components in MCP: isotactic polypropylene (iPP), atactic polypropylene (aPP), rubbery ethylene-propylene copolymer (EP), (ethylene rich, greater than 50 wt % by weight of the polymer is ethylene derived units) copolymer, and PE (ethylene-based homopolymer). For convenience, the (ethylene rich) copolymer which has a high C2 content is incorporated into the PE component as described herein. Also, it is assumed that the rubbery EP has a uniform comonomer composition across the molecules. It is further assumed that all the EP and aPP are soluble in a "strong" solvent such as oDCB, trichlorobenzene (TCB) or xylene at 25° C. and all the iPP and (ethylene rich) EP or PE are insoluble in the strong solvent at 25° C. With a proper analysis of the GPC chromatogram, a mathematical relationship among the EP content ("$C_{EP}$"), ethylene content of the EP ("$EP_{C2}$") can be found.

Thus in any embodiment, disclosed herein is a method of analyzing a MCP comprising, preferably in the following order:
  dissolving a MCP having a primary monomer and primary comonomer to form a volume V1 (soluble portion of MCP);
  injecting a portion of the V1 into a chromatographic column to get elution slices E1, leaving a volume V2 behind;
  filtering V2 to isolate MCP solids Mp;
  dissolving solids Mp to form solution V3 (insoluble portion of MCP);
  injecting a portion of V3 into the chromatographic column to get elution slices E3;
  obtain IR spectra at wavelengths suitable for the primary monomer and the primary comonomer of E1 and E3, separately; and
  for each elution slice E1 and E3, separately calculate: (a) the different polymer components (soluble and insoluble); and (b) the comonomer content of each component (soluble and insoluble).

The polymer components, preferably the EP component and its C2% content, can be determined mathematically from the IR measurements from the GPC instrument. First, the apparent concentration of soluble phase with the its mass recovery ($MR_{Solu}$) is calculated, and a concentration ($M_0/V_0$) where $M_0$ is assumed for the polymer mass in solution, while $V_0$ is the volume amount of solvent into the vial:

$$C_{GPC} = \frac{M_0}{V_0} MR_{Solu}.$$

Next, the apparent concentration to the actual concentration is prorated (same as that in parent sample) due to concentration diluted by adding solvent (V0):

$$C_{Solu} = \frac{V_{Sample2} + V_0}{V_{Sample2}} C_{GPC} = \left(1 + \frac{DV_0}{M_{Solu}}\right) \frac{M_0}{V_0} MR_{Solu}.$$

By "prorate" what is meant is that the volume and/or mass of something is increased or decreased proportionally, for instance if the liquid volume for soluble phase collected from filtration is V and the mass is V*C, the mass for soluble phase with volume (V+V0) will be prorated to be (V+V0)/V*C. Next, the mass ratio of soluble phase (EP+aPP) in MCP is calculated:

$$R_{Solu} = \frac{C_{Solu}}{C_{MCP}} = \left(1 + \frac{DV_0}{M_{Solu}}\right) \frac{M_0}{V_0} \frac{MR_{Solu}}{C_{MCP}};$$

where "D" is solvent density and the MCP is assumed to be fully dissolved; alternatively the $C_{MCP}$ can be determined with the similar procedure as $C_{Solu}$:

$$C_{MCP} = \left(1 + \frac{D^1 V_0}{{}^1 M_{MCP}}\right) \frac{{}^1 M_0}{{}^1 V_0} {}^1 MR_{MAP},$$

where the ${}^1M_0$, ${}^1V_0$, ${}^1M_{MCP}$, ${}^1MR_{MCP}$ in the first test are the counterparts for $M_0$, $V_0$, $M_{Solu}$ and $MR_{Solu}$ in the second test. In any case, the mass ratios of aPP, EP, PE and iPP phases in the MCP are calculated from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE};$$

wherefrom the $C_{EP}$ and $EP_{C2}$ of MCP can then be calculated:

$$C_{EP} = 100 \times (R_{EP} + R_{PE}); \text{ and}$$

$$EP_{C2} = 100 \times C2\%_{MCP}/C_{EP}$$

More particularly, in any embodiment is a method for determining the amount of various components (atactic PP, isotactic PP, rubbery EP and ethylene-rich EP) and the comonomer composition of each in a polymer blend ("MCP") comprising, preferably in the following order:
  in a first test, adding volume ${}^1V_0$ of solvent to an amount $M_{MCP}$ of a dry MCP and dissolving to form an MCP solution;
  withdrawing a volume ${}^1V_x$ of MCP solution and injecting the volume into a chromatographic column;
  replacing the amount of volume ${}^1V_x$ with solvent ${}^1V^{solv}$ in the MCP solution to form second volume ${}^2V_0$ of MCP solution;
  measuring the Infrared (IR) absorption of at least the primary monomer-derived unit stretch frequency and the comonomer-derived unit in elution volume slices (Ve) to determine the concentration of the MCP (${}^1C_{MCP}$) and the amount of comonomer;
  determining the mass recovery ($MR_{MCP}$) by integrating the chromatogram (concentration vs. elution volume slices) over the full range of elution volume and comparing the integral area of the tested sample with the corresponding homopolymer from the primary monomer-derived unit;
  determining the average comonomer content ($C2\%_{MCP}$) by integrating the chromatogram associated with the comonomer-derived unit and comparing its integral area with that for the primary monomer-derived unit;
  allowing the second volume ${}^2V_0$ to cool to 25° C., followed by filtering the solids from ${}^2V_0$; collecting a filtered solution from the second volume containing EP and aPP;
  determine the mass of the filtered solution ($M_{solu}$), forming the sample for a second test (Sample 2);

in a second test, adding volume $V_0$ of solvent to the amount $M_{solu}$ solution of the EP and aPP and dissolving;

in the second test, withdrawing a certain amount of solution containing the solution of the EP and aPP and injecting the volume $^1V_x$ into a chromatographic column;

measuring the Infrared (IR) absorption of at least the primary monomer-derived unit stretch frequency and the comonomer-derived unit in elution volume slices (Ve) so as to determine the concentration of the soluble ($C_{Solu}$) and the amount of comonomer ($S_{Solu}$);

determining the mass recovery ($MR_{Solu}$) by integrating the chromatogram (concentration vs. Ve) over the full range of elution volume and comparing the integral area of the tested sample with the corresponding homopolymer from the primary monomer-derived unit;

determining the average comonomer content ($C2\%_{Solu}$) by integrating the chromatogram associated with the comonomer-derived unit and comparing its integral area with that for the primary monomer-derived unit;

reselect integral limits by excluding the low MW peaks (attributable to aPP or PP) and determine the mass recovery ($MR_{EP}$) and average C2 content ($C2\%_{EP}$) for the remaining of the chromatograph (EP and PE components); and calculate the concentration of the soluble polymer in the solution of the EP and aPP with the following formulae:

1) calculate the apparent concentration of soluble phase with the its mass recovery ($MR_{Solu}$) and assumed concentration ($M_0/V_0$) where $M_0$ is the assumed polymer mass in solution and $V_0$ is the volume amount of solvent added into the vial:

$$C_{GPC} = \frac{M_0}{V_0} MR_{Solu},$$

2) prorate (proportionally increase or decrease the volume, mass, etc. in this case, if the liquid volume for soluble phase collected from filtration is V and the mass is V*C, the mass for soluble phase with volume ($V+V_0$) will be prorated to be $(V+V_0)/V$*C) the apparent concentration to the actual concentration due to concentration diluted by adding solvent ($V_0$):

$$C_{Solu} = \frac{V_{Sample-2} + V_0}{V_{Sample-2}} C_{GPC} = \left(1 + \frac{V_0 D}{M_{Solu}}\right) \frac{M_0}{V_0} MR_{Solu},$$

where the "D" is the solvent density at 25° C.

3) prorate the actual concentration of solution in sample 2 to that of sample 1 because of polymer mass loss and concentration dilution during injection/flush process:

$$C_{Solu\_1} = \frac{^2V_0}{^1V_0 - ^1V_x} C_{Solu} = \frac{^1V_0 - ^1V_x + ^1V^{Solv}}{^1V_0 - ^1V_x} C_{Solu},$$

4) calculate the mass ratio of soluble phase (EP+aPP) in MCP:

$$R_{Solu} = \frac{M_{EP+aPP}}{M_{MCP}MR_{MCP}} = \frac{^1V_0 C_{Solu\_1}}{M_{MCP}MR_{MCP}},$$

wherein the $MR_{MCP}$ appears in the equation is to counteract any effect from incorrect mass constant calibration;

5) calculate the mass ratio of aPP, EP, PE and iPP phase in MCP from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE}; \text{ and}$$

6) calculate the $C_{EP}$ and $EP_{C2}$ of MCP:

$C_{EP} = 100 \times (R_{EP} + R_{PE})$; and $EP_{C2} = 100 \times C2\%_{MCP}/C_{EP}.$ Also disclosed in any embodiment is a method for determining the amount of various components (atactic PP, isotactic PP, rubbery EP and ethylene-rich EP) and the comonomer composition of an MCP when the rubber content or the soluble content is very low, or determining the soluble content in a homopolyolefin such as ethylene or propylene based homopolymers or copolymers having less than 2, or 1 wt % comonomer-derived units, for example, homopolymer polypropylene (PP), the method comprising, preferably in the following order:

two tests performed in parallel in which the samples used in both test are dispensed from a parent solution of MCP, wherein in first test the dispensed sample is directly used, while in the second test the sample is prepared from the soluble phase of the parent solution by removing the insoluble solids after cooled to 25° C.;

prepare the parent solution concentration $C_{MCP} = M_{MCP}/V_{solvent}$ at least 2 mg/ml but below the level of precipitation while at a high enough temperature to dissolve all MCP solids, where the $M_{MCP}$ is the mass of MCP polymer added and $V_{solvent}$ is the volume of solvent added;

prepare two samples, the first sample having a first mass of MCP solution $^1M_{MCP}$ while still heated;

allowing the second sample to cool to at least 25° C., followed by filtering solids precipitated therefrom, where the solution contains mostly EP and aPP, where the mass of the solution ($M_{solu}$) forms the sample for the second test;

in the first sample, adding volume $^1V_0$ of solvent to the first sample $^1M_{MCP}$ dissolving the MCP at a high enough temperature to dissolve all MCP solid;

in the second sample, adding volume $V_0$ of solvent to the $M_{solu}$ solution of the EP and aPP, dissolving the polymer at any temperature above 20° C.;

measuring the Infrared (IR) absorption of at least the primary monomer-derived unit stretch frequency and the comonomer-derived unit in elution volume slices (Ve) of the first and second samples so as to determine the concentration of the polymer blend or soluble phase and the amount of comonomer;

determining the mass recovery by integrating the chromatogram (concentration vs. Ve) over the full range of elution volumes for the first and second samples and comparing the integral area of the tested sample with the corresponding homopolymer from the primary monomer-derived unit;

determining the average comonomer content by integrating the chromatogram associated with the comonomer-derived unit and comparing its integral area with that for the primary monomer-derived unit;

measuring the mass recovery and average comonomer content for the first sample, the MCP solution ($^1MR_{MCP}$, $C2\%_{MCP}$), and for the second sample measure the soluble phase ($MR_{Solu}$, $C2\%_{Solu}$);

reselect integral limits by excluding the low MW portion for the soluble phase (aPP) and determine the mass recovery ($MR_{EP}$) and average comonomer content ($C2\%_{EP}$) for the rest polymer (EP part); and calculate the concentration of the soluble polymer in the solution of parent sample with the following formulae:

1) calculate the apparent concentration of soluble phase with the its mass recovery ($MR_{Solu}$) and assumed concentration ($M_0/V_0$) where $M_0$ is the assumed polymer mass in solution and $V_0$ is the volume amount of solvent added:

$$C_{GPC} = \frac{M_0}{V_0} MR_{Solu};$$

2) prorate the apparent concentration to the actual concentration (same as that in parent sample) due to concentration diluted by adding solvent ($V_0$):

$$C_{Solu} = \frac{V_{Sample-2} + V_0}{V_{Sample-2}} C_{GPC} = \left(1 + \frac{V_0 D}{M_{Solu}}\right) \frac{M_0}{V_0} MR_{Solu};$$

where "D" is solvent density.

3) calculate the mass ratio of soluble phase (EP+aPP) in MCP:

$$R_{Solu} = \frac{C_{Solu}}{C_{MCP}} = \left(1 + \frac{DV_0}{M_{Solu}}\right) \frac{M_0}{V_0} \frac{MR_{Solu}}{C_{MCP}};$$

where the MCP is assumed to be fully dissolved; alternatively the $C_{MCP}$ can be determined with the similar procedure as $C_{Solu}$:

$$C_{MCP} = \left(1 + \frac{^1V_0 D}{^1M_{MCP}}\right) \frac{^1M_0}{^1V_0} {^1MR_{MCP}},$$

where the $^1M_0$, $^1V_0$, $^1M_{MCP}$, $^1MR_{MCP}$ in the first test are the counterparts for $M_0$, $V_0$, $M_{Solu}$ and $MR_{Solu}$ in the second test;

4) calculate the mass ratio of aPP, EP, PE and iPP phase in MCP from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE};\text{ and}$$

5) calculate the $C_{EP}$ and $EP_{C2}$ of MCP:

$$C_{EP} = 100 = (R_{EP} + R_{PE});\text{ and } EP_{C2} = 100 \times C2\%_{MCP}/C_{EP}.$$

Also, disclosed in any embodiment is a method of analyzing the soluble component (in a strong solvent at 25° C.) of an MCP comprising, preferably in the following order:

two tests performed in parallel in which the samples used in both test are dispensed from a parent solution of MCP, wherein in first test the dispensed sample is directly used, while in the second test the sample is prepared from the soluble phase of the parent solution by removing the insoluble solids after cooled to 25° C.;

prepare the parent solution concentration $C_{MCP} = M_{MCP}/V_{solvent}$ below the level of precipitation while at a high enough temperature to dissolve all MCP solids, where the $M_{MCP}$ is the mass of MCP polymer added and $V_{solvent}$ is the volume of solvent added;

prepare two samples, the first sample having a first mass of MCP solution $^1M_{MCP}$ while still heated;

allowing the second sample to cool to at least 25° C., followed by filtering solids precipitated therefrom, where the mass of the solution ($M_{solu}$) forms the sample for the second test;

in the first sample, adding volume $^1V_0$ of solvent to the first sample $^1M_{MCP}$ dissolving the MCP at a high enough temperature to dissolve all MCP solid;

in the second sample, adding volume $V_0$ of solvent to the $M_{solu}$ solution of the solubles, dissolving the polymer at any temperature above 20° C.;

measuring the Infrared (IR) absorption of at least the primary monomer-derived unit stretch frequency in elution volume slices (Ve) of the first and second samples so as to determine the concentration of the polymer blend or soluble phase;

determining the mass recovery by integrating the chromatogram (concentration vs. Ve) over the full range of elution volumes for the first and second samples and comparing the integral area of the tested sample with the corresponding homopolymer from the primary monomer-derived unit;

measuring the mass recovery for the first sample, the MCP solution ($^1MR_{MCP}$), and for the second sample, the soluble phase ($MR_{Solu}$); and calculate the concentration of the soluble polymer in the solution of parent sample with the following formulae:

1) calculate the apparent concentration of soluble phase with the its mass recovery ($MR_{Solu}$) and assumed concentration ($M_0/V_0$) where $M_0$ is the assumed polymer mass in solution and $V_0$ is the volume amount of solvent added:

$$C_{GPC} = \frac{M_0}{V_0} MR_{Solu};$$

2) prorate the apparent concentration to the actual concentration (same as that in parent sample) due to concentration diluted by adding solvent ($V_0$):

$$C_{Solu} = \frac{V_{Sample-2} + V_0}{V_{Sample-2}} C_{GPC} = \left(1 + \frac{V_0 D}{M_{Solu}}\right) \frac{M_0}{V_0} MR_{Solu};$$

where "D" is solvent density.

3) calculate the mass ratio of soluble phase in MCP:

$$R_{Solu} = \frac{C_{Solu}}{C_{MCP}} = \left(1 + \frac{DV_0}{M_{Solu}}\right) \frac{M_0}{V_0} \frac{MR_{Solu}}{C_{MCP}};$$

where the MCP is assumed to be fully dissolved; alternatively the $C_{MCP}$ can be determined with the similar procedure as $C_{Solu}$:

$$C_{MCP} = \left(1 + \frac{{}^1V_0 D}{{}^1M_{MCP}}\right) \frac{{}^1M_0}{{}^1V_0} {}^1MR_{MCP};$$

4) calculate the mass ratio of aPP, EP, PE and iPP phase in MCP from $R_{Solu}$; where the ${}^1M_0$, ${}^1V_0$, ${}^1M_{MCP}$, ${}^1MR_{MCP}$ in the first test are the counterparts for $M_0$, $V_0$, $M_{Solu}$ and $MR_{Solu}$ in the second test:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE}; \text{ and}$$

5) calculate the $C_{EP}$ and $EP_{C2}$ of MCP:

$$C_{EP} = 100 \times (R_{EP} + R_{PE}); \text{ and } EP_{C2} = 100 \times C2\%_{MCP}/C_{EP}.$$

In any embodiment, the strong solvent can be different from the solvent used in the GPC mobile phase as long as they are miscible with one another. However to minimize the effect from different solvents, the solution sample made from that solvent should be small amount (such as 10%) or highly concentrated. For example, to measure the xylene soluble fraction of MCP, a complicated procedure or instrumentation is needed because all the mass has to be collected. With the presently disclosed method, the procedure is very simple.

In any embodiment, the MCP useful herein comprises a propylene homopolymer and an ethylene-propylene copolymer, wherein the ethylene-propylene copolymer has within the range from 5, or 10 wt % to 40, or 50, or 60 wt % ethylene-derived units by weight of the copolymer. In any embodiment, the MCP has an ethylene-propylene copolymer content within the range from 10, or 20 wt % to 40, or 50 wt % by weight of the MCP.

In any embodiment is a chromatographic system comprising at least a chromatographic column such as a gel permeation column, a temperature elution column, and/or any other type of column suitable for separating out polymers from a mixture of polymers, and at least one such column having detectors in which the output is captured by a computing system comprising code to convert the output into a concentration as a function of molecular weight and/or comonomer composition by the methods described herein for at least the rubber component of the MCP. Such a computing system might also include means for sample pre-treatment and data smoothing. As used herein, a "computer" or "computing system" is a general purpose device that can be coded or programmed to carry out a set of arithmetic or logical operations automatically, and may also be capable of either manual data input or automatic acceptance of data from a source or output such as a chromatographic detector.

The various descriptive elements and numerical ranges disclosed herein for the inventive methods can be combined with other descriptive elements and numerical ranges to describe the invention(s); further, for a given element, any upper numerical limit can be combined with any lower numerical limit described herein, including the examples in jurisdictions that allow such combinations. The features of the inventions are demonstrated in the following non-limiting examples.

EXAMPLES

Samples

All of the MCP samples used in the study are made by ExxonMobil. The xylene solubles ("Xylene" method) were fractionated from MCP in the following manner: 2 grams of MCP sample (either in pellet or ground pellet form) is placed into a 300 ml conical flask; 200 ml of xylene is added into the conical flask with stir bar and the flask is secured on a heating oil bath. The oil bath is heated to allow melting of the polymer by leaving the flask in oil bath at 135° C. for about 15 minutes while stirring. When melted, discontinue heating, but continue stirring through the cooling process. Allow the dissolved polymer to cool spontaneously overnight. The precipitate is filtered with Teflon filter paper and then dried under vacuum at 90° C. The quantity of xylene soluble ($C_{EP}$) is determined by calculating the percent by weight of total polymer sample ("A") less precipitate ("B") at 25° C. [soluble content=((A−B)/A)×100]. $^{13}C$ can then be performed on fractions to determine the C2%.

As another reference, a low field NMR study in combination with a Fourier Transform IR study, or "LFNMR/FTIR" was conducted. The low field $^{13}C$ NMR results are obtained on an Oxford Instruments NMR 100 MHz spectrometer at a solid sample temperature of 70° C. Samples were conditions for 20 minutes. Acquisition delay was 11.5 μs. The NMR signal was collected after a single 90 degree pulse, and automatically fit by a 2- or 3-component model, Gaussian +2 exponentials curve fitting model. The fractions of the three components (iPP, aPP, and EP) have T2's of about 9, 35, and 500 μs, respectively. For the FTIR portion, MCP samples were compression molded into 10 mil pads: from MCP pellets melted at 232° C. between platens on a tray with a minimum of pressure, then close patens to a pressure of 20 tons and continue heating for 5 minutes, followed by cooling to 25° C. under same pressure, pads measured to ensure 10±1.5 mil thickness. These pads were individually placed in the sample compartment of a Thermo Nicolet Magna IR spectrometer to obtain IR spectra with a 4,500 to 400 cm$^{-1}$ spectral range, especially 800 to 600 cm$^{-1}$. Spectral acquisition were set at 2 cm$^{-1}$ resolution, 32 co-added scans, Happ-Genzel apodization function, no zero filing. Using Beer Lampert's Law, the total ethylene content of the MCP's was determined by correlating the carbon NMR data to the absorbance area of the methylene rocking region.

Inventive GPC Test Procedure

A PolymerChar GPC-IR (GPC4D-SCB) with IR5 MCT (2012) instrument was used. A certain amount of dry polymer (from 5 to 10 mg MCP) sample was weighted and put into a standard 10 ml Agilent vial, then loaded into the autosampler for GPC run. The vial was filled with 8 ml TCB solvent for polymer dissolution. Following injection, the vial with the solution was exited to the autosampler tray and allowed to cool down to room temperature (25° C.) in the open air. In standard test procedures, the GPC-4D test was completed and the vial was discarded. However, in this procedure, the waste was reused for a second test following a simple sample treatment: the cooled MCP solution is filtered with a filter paper and part of the solution was collected with an empty vial. The new vial with the soluble polymer was weighted and retested with GPC-4D while the residual solution in the original vial and the filter paper with the insoluble polymer were discarded (see FIG. 1). The volume of the solution in the new vial was usually less than 8 ml and may not be enough for another GPC test. Hence, some amount of solvent was added so that the total volume of the solution is close to 8 ml. The solution concentration in the second test was usually very dilute, particularly when rubber content was low. In order to improve signal to noise ratio, a double or triple injection was often used and the chromatograms are co-added. Therefore in this new procedure, two subsequent tests need to be performed on each MCP sample with at least several hours apart for the cooling. It was inefficient if the sample was tested in one-on-one fashion because sample cooling will take time. However it can be much more efficient if testing and processing are in a batch mode. A typical GPC-IR can run a batch of 20 or more samples a day. Two batches of tests will take about two days of instrument time. If including the cooling, filtration and data processing time together, which may take another day, the total time to process 20 or more samples took about three days.

$C_{EP}/EP_{C2}$ Measurement

It was assumed that the MCP has the components: iPP, aPP, rubbery EP, ethylene rich EP, and PE. The ethylene rich EP has high C2 content and was incorporated into PE component in this study. It was also assumed that the rubbery EP has a uniform comonomer composition across all the molecules. It was further assumed all the rubbery EP and aPP were soluble in a strong solvent, in this case TCB, at 25° C. and all the iPP and ethylene rich EP or PE were insoluble at 25° C. The $C_{EP}$ thus, can be calculated as:

$$C_{EP} = 100 \times \frac{M_{EP} + M_{PE}}{M_{MCP}} = 100 \times (R_{EP} + R_{PE}),$$

where the $M_{EP}$ and $M_{PE}$ are the mass of EP and PE component in original MCP mass ($M_{MCP}$) while the $R_{EP}$ and $R_{PE}$ are the mass ratios. The $EP_{C2}$ thus can be calculated from $C_{EP}$ according to the definition:

$$EP_{C2} = 100 \times (C2\%/C_{EP}),$$

The C2% is the total C2 content in MCP sample in weight percentage which can be directly measured. Therefore the key is to find the masses or the mass ratios for EP and PE components.

Just as described in the experimental section, this method includes two tests: Test I was with the dry MCP sample (sample I, an exemplar impact copolymer, or "ICP") while the Test II was with the soluble part (sample II) of the MCP solution at 25° C. In the first test, MCP dry polymer is dissolved in 8 ml TCB solvent at 160° C. In the second test, only a small amount of TCB solvent needs to add because the sample has already been in solution. The volume amount to be added was estimated to be:

$$V_{TCB} = 8 - M_{Solu}/d_{TCB},$$

where $M_{Solu}$ is the mass for sample II and the $d_{TCB}$ is 1.454 g/ml, the density of TCB at 25° C. The polymer mass in the solution $M_0$ is unknown, but can be assumed to be some value. For the convenience of calculation, the $M_0$ was usually set equal to $V_{TCB}$ ($M_0$ is in unit of mg and $V_{TCB}$ in ml) so that the nominal concentration in the soluble phase is 1.0 mg/ml.

The mass recovery and the average C2 content were directly obtained from the GPC data for each test.

Figure 2:
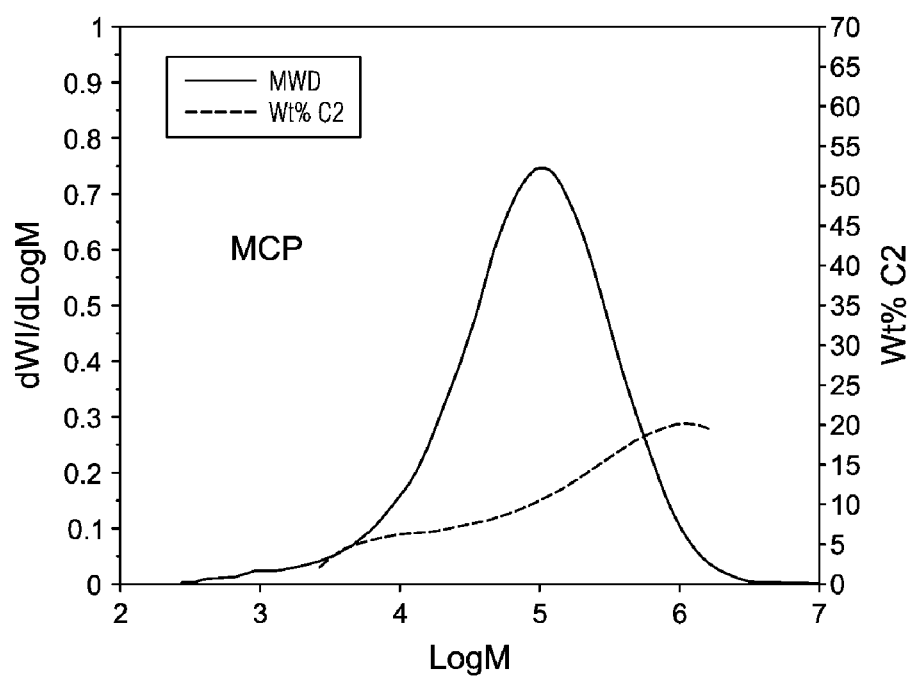
FIG. 2 is a GPC-IR chromatogram for an MCP sample in Test I, where the mass recovery and the average C2 (ethylene-derived units) content can be directly provided by integrating the chromatogram.

Test I: MCP mass recovery ($MR_{MCP}$) and C2 content ($C2\%_{MCP}$) See FIG. 2;

Test II: The mass recovery ($MR_{Solu}$) and the C2% ($C2\%_{Solu}$) for the whole soluble phase.

Figure 3A:
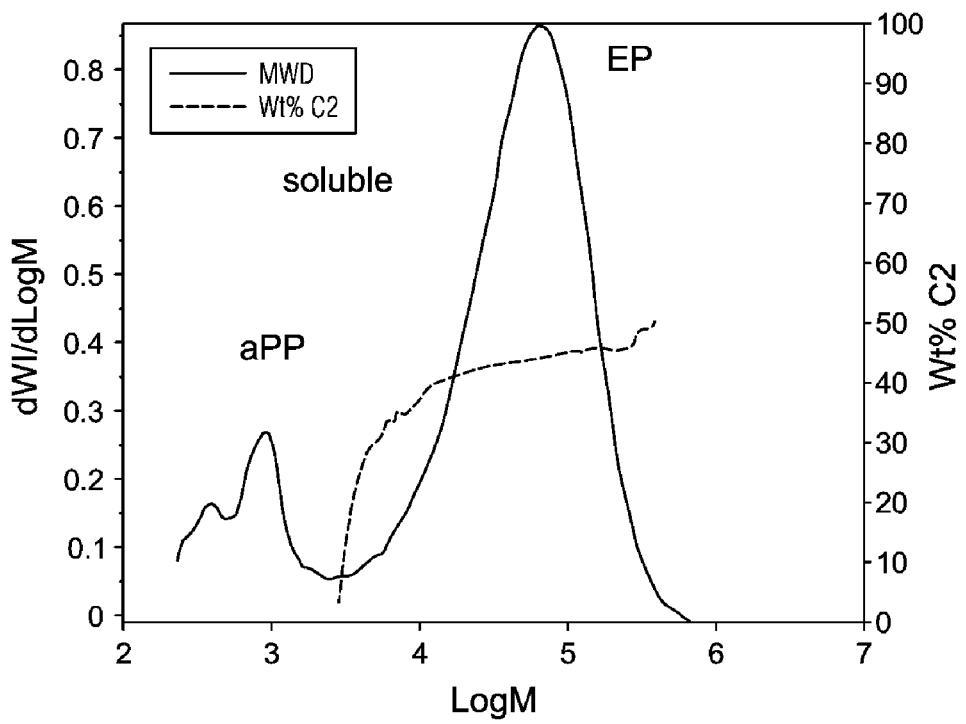
FIG. 3a is a GPC-IR chromatogram for the soluble phase sample in Test II.
Figure 3B:
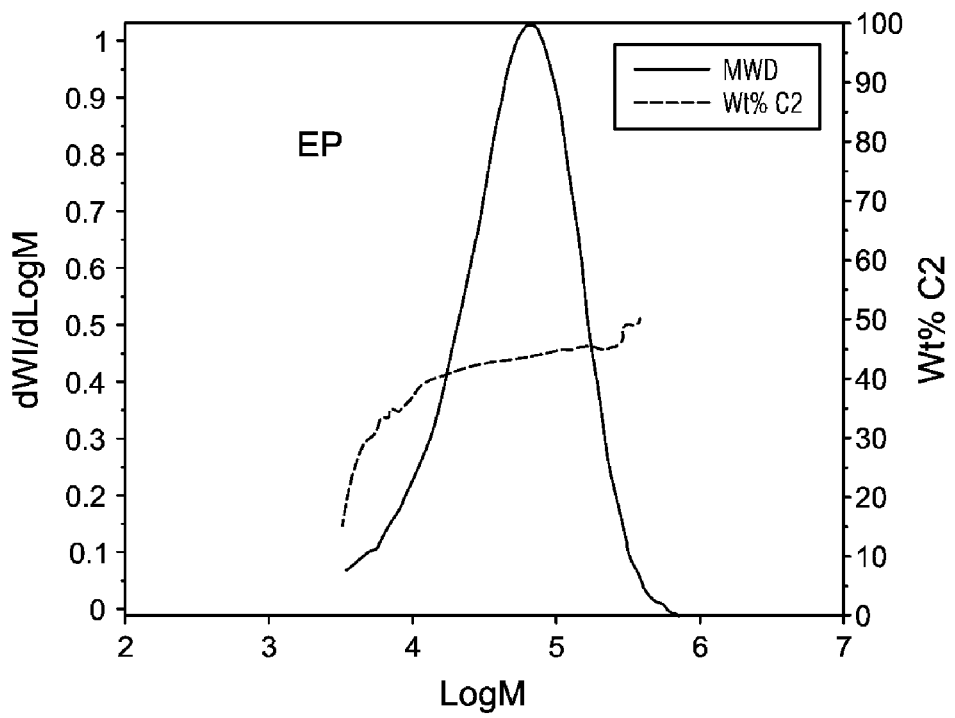
FIG. 3b is a GPC-IR chromatogram for the EP phase only.

Additionally, the aPP usually has much lower MW than EP and they are naturally separated in GPC chromatogram (FIG. 3a). Therefore, we can also obtain the mass recovery and C2% for the EP phase ($MR_{EP}$, $C2\%_{EP}$) be excluding the aPP signal. See FIG. 3b.

Mass Fraction of the Soluble Phase

The mass fraction of the soluble phase were calculated with the following procedure. The concentration of soluble phase (EP+aPP) in test sample II can be calculated from the polymer mass recovery if the mass constant is calibrated. However it can be seen in the latter analysis that the $C_{EP}$ or $EP_{C2}$ is only related to the mass ratios. The apparent concentration of the soluble phase directly measured by GPC is:

$$C_{GPC} = \frac{M_0}{V_{TCB}} MR_{Solu}.$$

This needs to be prorated to the true concentration of soluble phase in sample II because it was diluted by added solvent in the second test:

$$C_{Solu} = \frac{V_{Sample-II} + V_{TCB}}{V_{Sample-II}} C_{GPC} = \left(1 + \frac{V_{TCB} d_{TCB}}{M_{Solu}}\right) \frac{M_0}{V_{TCB}} MR_{Solu}.$$

However to obtain the total mass of the soluble phase in sample I ($M_{EP+aPP}$), the process of sample dissolution and injection inside the GPC instrument was controlled by re-directed the default mode of the instrument. The PolymerChar autosampler provides some automatic features so that the volume of solvent for dissolution, injection and rinse can be programmed. In this study, 8 ml was set for dry polymer dissolution, 1.2 ml (polymer solution) for injection, and 1.0 ml (fresh TCB) for rinse. The rinsed solvent flows back into the vial. Since the solvent exchange happens in the vial, the concentration $C_{Solu}$ was not exactly the same as the one in the original solution. When 1.2 ml MCP solution was drawn from the vial and injected to the system, some MCP mass is lost and the remaining MCP mass=$(8-1.2)/8\, M_{MCP}$. On the other hand, 1.0 ml fresh solvent was added to the vial, which causes the final solution volume in the vial to end up with $8-1.2+1=7.8$ ml. Note that these volumes are exemplary and could be any desirable amount.

With the above information, the mass of soluble phase in sample I ($M_{EP+aPP}$), was found from the below equation:

$$C_{Solu} = \left(\frac{8-1.2}{8} M_{EP+aPP}\right)/(8 - 1.2 + 1),$$

therefore the relationship:

$$M_{EP+aPP} = 9.176\left(1 + \frac{V_{TCB}d_{TCB}}{M_{Solu}}\right)\frac{M_0}{V_{TCB}}MR_{Solu},$$

the corresponding concentration in test sample I for soluble phase was expressed as:

$$C_{Solu-1} = \frac{M_{EP+aPP}}{8} = 1.147\left(1 + \frac{V_{TCB}d_{TCB}}{M_{Solu}}\right)C_{GPC},$$

The factor before "$C_{GPC}$" is called dilation factor which relates the apparent concentration to the actual concentration of soluble phase.

Mass Ratio of Each Component

Ratio of soluble phase (EP+aPP) in MCP (pseudo $C_{EP}$):

$$R_{Solu} = \frac{M_{EP+aPP}}{M_{MCP}MR_{MCP}} = 9.176\left(1 + \frac{1.454V_{TCB}}{M_{Solu}}\right)\frac{MR_{Solu}}{MR_{MCP}}\frac{M_0/V_{TCB}}{M_{MCP}}.$$

Ratio of aPP phase in MCP:

$$R_{aPP} = \left(1 - \frac{MR_{EP}}{MR_{Solu}}\right)R_{Solu}.$$

Ratio of EP phase in MCP:

$R_{EP}=R_{Solu}-R_{aPP}.$

Ratio of PE phase (assume 100% C2) in MCP:

$R_{PE}=(C2\%_{MCP}-C2\%_{Solu}R_{Solu})/100.$

Ratio of iPP phase in MCP:

$R_{iPP}=1-R_{Solu}-R_{PE}.$ $C_{EP}$ and $EP_{C2}$ of MCP are thus found to be:

$$C_{EP} = 100 \times (R_{EP} + R_{PE});\ G_V = 100 \times \frac{C2\%_{MAP}}{C_V}.$$

Here the parameters used in the calculation are summarized as following:

Directly measured with balance: dry polymer mass and solution mass:
  $M_{MCP}$, $M_{Solu}$.
Directly obtained from GPC chromatogram: mass recovery and C2 content:
  $MR_{MCP}$; $MR_{Solu}$; $M_{EP}$,
  $C2\%_{MCP}$; $C2\%_{Solu}$; $C2\%_{EP}$.
Additional input: estimated TCB volume added in the second test and the polymer mass in solution:
  $V_{TCB}$, $M_0$.

MWD Deconvolution

The soluble phase including EP and aPP components were directly deconvoluted due to different molecular weight (MW) range, therefore their MW distribution can be directly provided. The insoluble phase was not measured. The MWD (Mw/Mn) for PE and the iPP component has to be deconvoluted based on the below equations:

$c_{PE}+c_{PP}=c_{MCP}-c_{Solu-1}$ $c_{PE}s_{PE}+c_{PP}s_{PP}=c_{MCP}s_{MCP}-c_{Solu-1}s_{Solu-1}$ where the "c" and "s" stand for the concentration and the Wt % C2 respectively, for Sample 1. For MCP system, $s_{PP}$ is about zero, and $s_{PE}$ is about 100, all other quantities:

($c_{MCP}$, $c_{Solu-1}$, and $s_{MCP}$, $s_{Solu-1}$)

are directly measured (note: $c_{Solu-1}$ and $c_{Solu}$ differ by a dilation factor and $s_{Solu-1}=s_{Solu}$). The $c_{PE}$ and $c_{PP}$ thus can be solved from the above equations.

MCP Standards

Figure 4A:
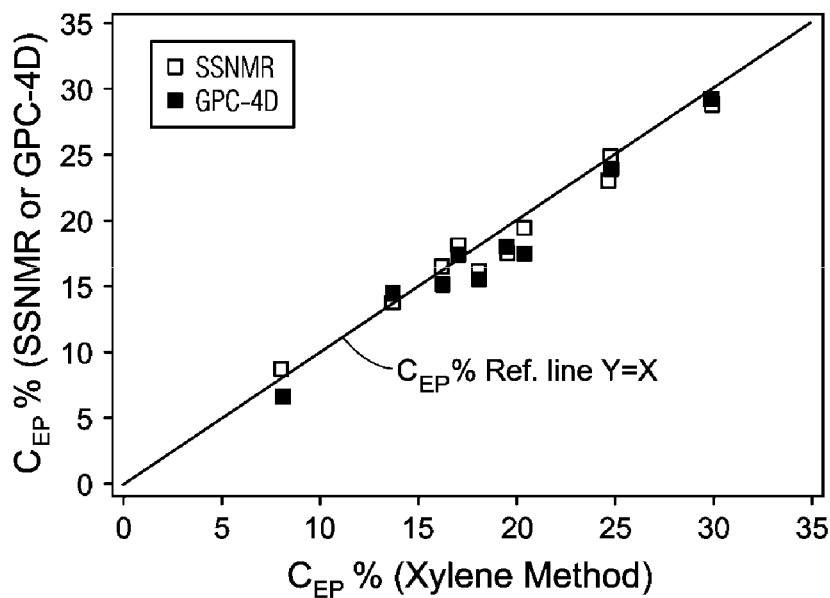
FIG. 4a and FIG. 4b are a comparisons among the prior art xylene method, LFNMR+FTIR method and inventive GPC-4D methods for finding (a) $C_{EP}$ (the weight percent of EP in the composition); (b) $EP_{C2}$ (the weight percent of ethylene derived units "C2" in the EP). The reference line "Y=X" is drawn to facilitate the comparison.
Figure 4B:
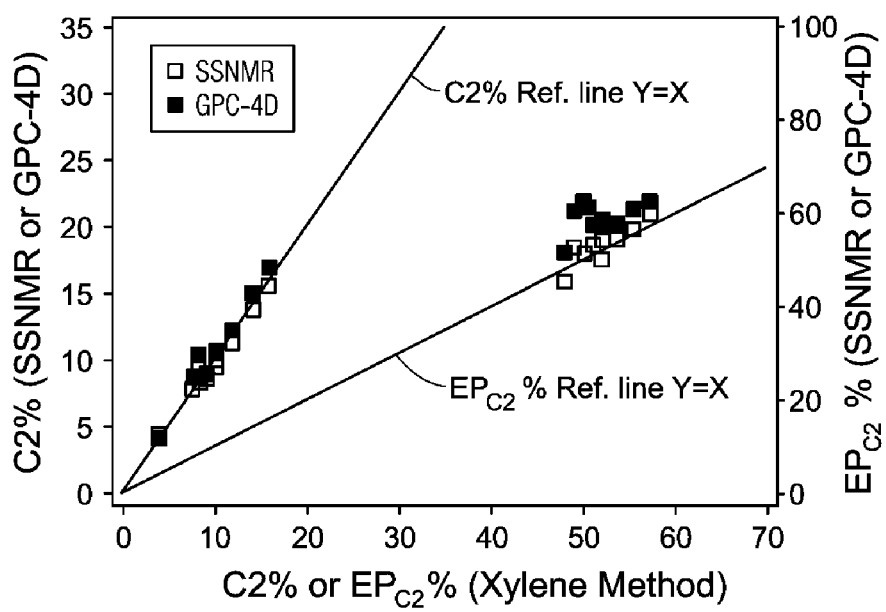

A series of MCP standards which were used to establish low field NMR (LFNMR) and FTIR ("LFNMR+FTIR") and from the Xylene method were tested along with the methodology described herein. Table 1 describes the $C_{EP}/EP_{C2}$ value provided by the Xylene method and LFNMR+FTIR method. FIG. 4 shows a comparison about $C_{EP}/EP_{C2}$ measurement among the two current methods and the GPC-4D method. FIG. 4a is a plot of the two prior art methods of determining $C_{EP}$ with the inventive examples of measuring $C_{EP}$ superimposed, and FIG. 4b is same plot for $EP_{C2}$ and C2%. A reference line about "Y=X" is drawn to facilitate the comparison. The results are generally consistent with each other within the experimental error. The average offset for inventive GPC-4D method from Xylene method was about 0.99% lower for $C_{EP}$ and 7.2% higher for $EP_{C2}$. These offsets were a little bit higher than those between LFNMR+FTIR method and Xylene method, particularly for $EP_{C2}$ (see Table 2). To understand the reason, the contribution to the deviation of $EP_{C2}$ from each error source is calculated based on the error propagation relationship reflected in the below equation. The results are also shown in the Table 1.

$$\delta EP_{C2} = \frac{\delta C2}{C_{EP}} + EP_{C2}\frac{\delta C_{EP}}{C_{EP}}.$$

The above equation relates that the $EP_{C2}$ can be influenced by both the $C_{EP}$ and the C2% deviation. Since the $C_{EP}$ appears in the denominator and is usually a small number (<20%), a small change in C2% or $C_{EP}$ can be amplified by several times. Comparing C2% with $C_{EP}$, the $EP_{C2}$ seems more sensitive to the deviation of the former because $EP_{C2}$ is less than 1. The deviation in C2% is usually attributed to instrument calibration, which can be reduced if both FTIR and GPC-4D use same calibrants.

TABLE 1

MCP Standard Samples used for the Establishment of LFNMR + FTIR Method

| | Xylene Extraction Method | | LFNMR + FTIR | |
|---|---|---|---|---|
| Sample # | $C_{EP}$ (%) | $EP_{C2}$ (%) | $C_{EP}$ (%) | $EP_{C2}$ (%) |
| 1 | 24.75 | 48 | 24.75 | 45.33 |
| 2 | 29.81 | 53.61 | 28.63 | 54.34 |
| 3 | 24.6 | 57.25 | 23.06 | 59.66 |
| 4 | 18 | 51 | 16.22 | 53.26 |
| 5 | 19.4 | 52 | 17.51 | 54.14 |
| 6 | 13.65 | 55.4 | 13.77 | 56.34 |
| 7 | 20.3 | 50.4 | 19.36 | 51.4 |
| 8 | 8 | 50 | 8.82 | 51.59 |
| 9 | 17 | 49 | 18.13 | 52.56 |
| 10 | 16.2 | 52 | 16.46 | 50.3 |

TABLE 2

Average Offsets for GPC-4D Method from
The Xylene Method and the Error Contribution to $EP_{C2}$ Deviation

|  | Average Offset from Xylene method | | | Error Contribution to $EP_{C2}$ deviation | |
|---|---|---|---|---|---|
|  | $C_{EP}$% | $EP_{C2}$% | C2% | $C_{EP}$% deviation | C2% deviation |
| LFNMR + FTIR | −0.50 | 1.0 | −0.1 | 1.4 | −0.5 |
| GPC-4D | −0.99 | 7.2 | 0.7 | 2.8 | 3.7 |

MCP Commercial Grades

Figure 5A:
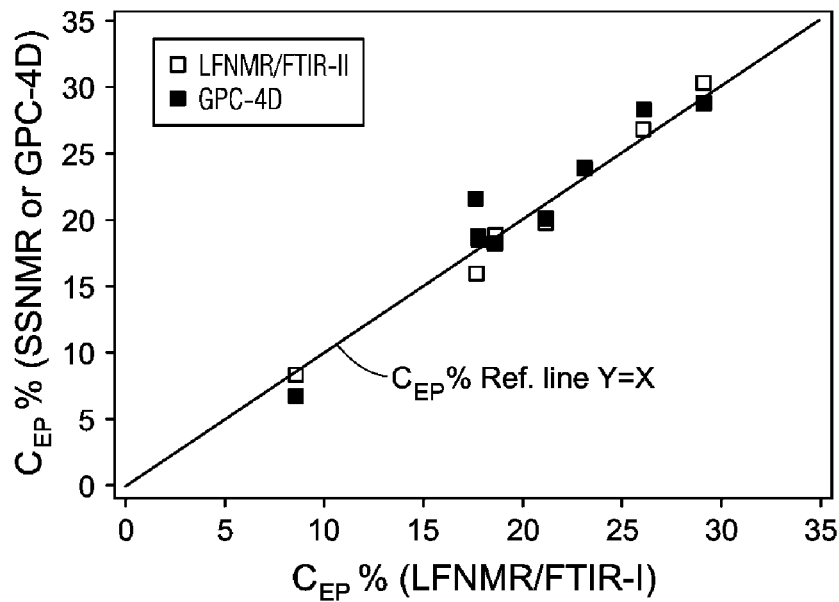
FIG. 5a and FIG. 5b are comparisons between the LFNMR+FTIR method and inventive GPC 4D method for finding (a) $C_{EP}$; (b) $EP_{C2}$ and C2%.
Figure 5B:
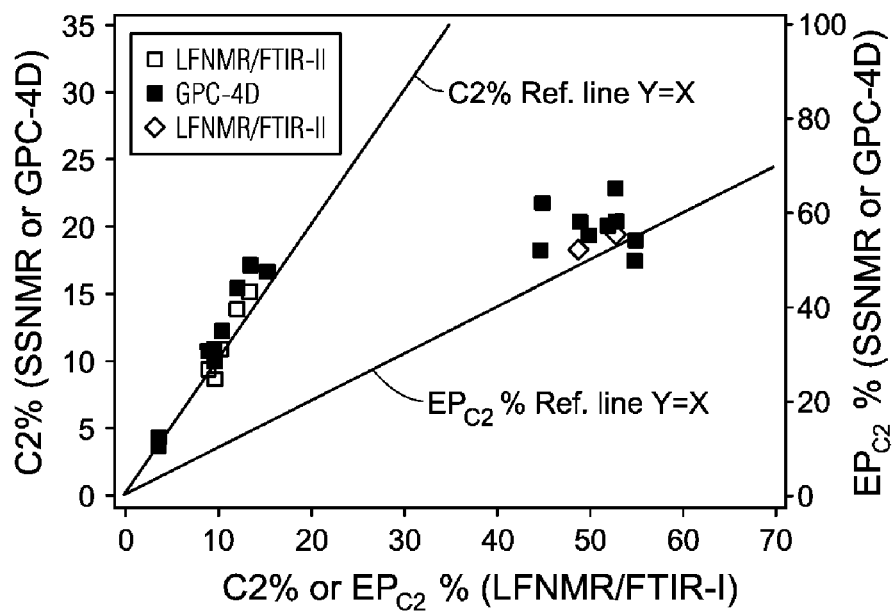

In the same way, a series of ExxonMobil commercial grade MCP's were tested for comparison to the inventive process. The $C_{EP}/EP_{C2}$/C2% values were measured with LFNMR+FTIR method in two different periods with at least several months difference in the time they were produced (runs I versus runs II). These quantities were also measured with the inventive GPC-4D method recently and the results are listed in Table 3 together with corresponding LFNMR+FTIR measurements. All the data were plotted in FIGS. 5a and 5b for comparison. The offset between the two LFNMR+FTIR tests and GPC-4D tests are shown in Table 4. The GPC-4D results are consistent with LFNMR results. Again, a relatively higher offset on $EP_{C2}$ which is attributed to C2% calibration.

TABLE 3

Comparison of $C_{EP}/EP_{C2}$/C2 Measurement Between LFNMR + FTIR Method and GPC-4D Method for Commercial MCP Grades

| EM MCP grades | $C_{EP}/EP_{C2}$/C2% (LFNMR + FTIR) I | $C_{EP}/EP_{C2}$/C2% (LFNMR + FTIR) II | $C_{EP}/EP_{C2}$/C2% (Inventive) |
|---|---|---|---|
| AXO3B | 18.5/49/9.1 | 18.6/52/9.3 | 18.2/58/10.6* |
| PP7032E2 | 17.6/55/9.7 | 15.8/54/8.5 | 18.5/53/9.8 |
| PP7033E2 | 17.6/55/9.7 | 18.3/50/9.2 | 21.4/51/10.7* |
| PP7414 | 21.0/50/10.5 | 19.7/55/10.8 | 20.0/60/12.1* |
| PP7815E1 | 8.5/45/3.8 | 8.1/52/4.2 | 6.5/60/3.8* |
| PP7855E1 | 23.0/53/12.2 | 23.7/58/13.8 | 23.7/65/15.3 |
| PP7905E1 | 8.5/45/3.8 | 6.7/62/4.2 | 6.6/54/3.6 |
| PP8244E1 | 29.0/53/15.4 | 30.2/55/16.6 | 28.6/58/16.6* |
| PP8255E1 | 26/52/13.5 | 26.6/57/15.1 | 28.2/60/17.0 |

*Average from two runs

TABLE 4

Average Offsets For GPC-4D Method from LFNMR + FTIR Method (1st Test) and the Error Contribution to $EP_{C2}$ Deviation from Different Sources

|  | Average Offset from LFNMR + FTIR (I) | | | Error Contribution to $EP_{C2}$ deviation | |
|---|---|---|---|---|---|
|  | $C_{EP}$% | $EP_{C2}$% | C2% | $C_{EP}$% deviation | C2% deviation |
| LFNMR + FTIR (II) | −0.22 | 4.2 | 0.4 | 0.60 | 2.3 |
| Inventive GPC-4D | 0.22 | 6.0 | 1.3 | −0.60 | 6.9 |

Data Reproducibility

The amount of sample needed for GPC-4D test is comparable with the size of a granule while it has been shown that the rubber content of a MCP and MWD vary granule by granule for MCP samples. Thus, a study was conducted to look at data reproducibility. In order to avoid the heterogeneity issue, all the samples used in the test were pelletized or homogenized in some way. To verify the homogeneity of the sample and also the robustness of this method, some tests were performed twice. Table 5 shows the $C_{EP}/EP_{C2}$/C2% measured for a series of commercial grades in the same periods, which demonstrates good data reproducibility.

TABLE 5

Comparison of $C_{EP}/EP_{C2}$/C2% measured in two different periods with EM MCP grades

| EM MCP grades | $C_{EP}/EP_{C2}$/C2% (1st run) | $C_{EP}/EP_{C2}$/C2% (2nd run) | $C_{EP}/EP_{C2}$/C2% (Average) |
|---|---|---|---|
| AXO3B | 17.9/59/10.5 | 18.4/58/10.7 | 18.2/58/10.6 |
| PP7033E2 | 24.4/45/11.1 | 18.4/56/10.4 | 21.4/51/10.7 |
| PP7414 | 20.1/60/12.0 | 19.9/61/12.2 | 20.0/60/12.1 |
| PP7815E1 | 6.1/63/3.8 | 6.8/57/3.9 | 6.5/60/3.8 |
| PP8244E1 | 31.6/58/18.4 | 25.6/58/14.9 | 28.6/58/16.6 |

MWD Deconvolution and Mass Fraction for Each Component in MCP

The MWD (Mw/Mn) deconvolution for aPP, iPP, EP and PE components were performed for one MCP standard with the method described above. Table 6 lists the composition of each component together with the $C_{EP}/EP_{C2}$/C2% value. Table 7 lists the mass fraction of each component for a series of commercial MCP grades. Table 6 shows the $EP_{C2}$ value in an MCP material is not the same as the comonomer content (43 wt %) in EP. This analysis also tells that the optimization of rubber phase comonomer composition in lab reactor or plant reactor may not be effectively achieved through tuning $EP_{C2}$ alone because of the uncontrolled PE phase.

TABLE 6

Composition of Each Component and the $C_{EP}/EP_{C2}$/C2% Value for an MCP Standard

|  | aPP | EP | PE | iPP | GPC-4D Method (Xylene Method) |
|---|---|---|---|---|---|
| Wt % | 1.9% | 9.9% | 4.6% | 83.6% | $C_{EP}$ = 14% (14%) |
| C2% | 0 | 43% | 100% | 0% | $EP_{C2}$ = 61% (55%) |

TABLE 7

Mass Fraction of Each Component for a Series of Commercial MCP Grades

| EM MCP grades | aPP | EP | PE | iPP |
|---|---|---|---|---|
| AXO3B | 0.032 | 0.141 | 0.038 | 0.789 |
| PP7032E2 | 0.013 | 0.121 | 0.064 | 0.802 |
| PP7033E2 | 0.018 | 0.184 | 0.061 | 0.738 |
| PP7414 | 0.013 | 0.143 | 0.058 | 0.787 |
| PP7815E1 | 0.020 | 0.035 | 0.026 | 0.920 |
| PP7855E1 | 0.016 | 0.152 | 0.085 | 0.747 |
| PP7905E1 | 0.014 | 0.041 | 0.025 | 0.919 |
| PP8244E1 | 0.011 | 0.231 | 0.085 | 0.673 |
| PP8255E1 | 0.013 | 0.198 | 0.084 | 0.705 |

Figure 6A:
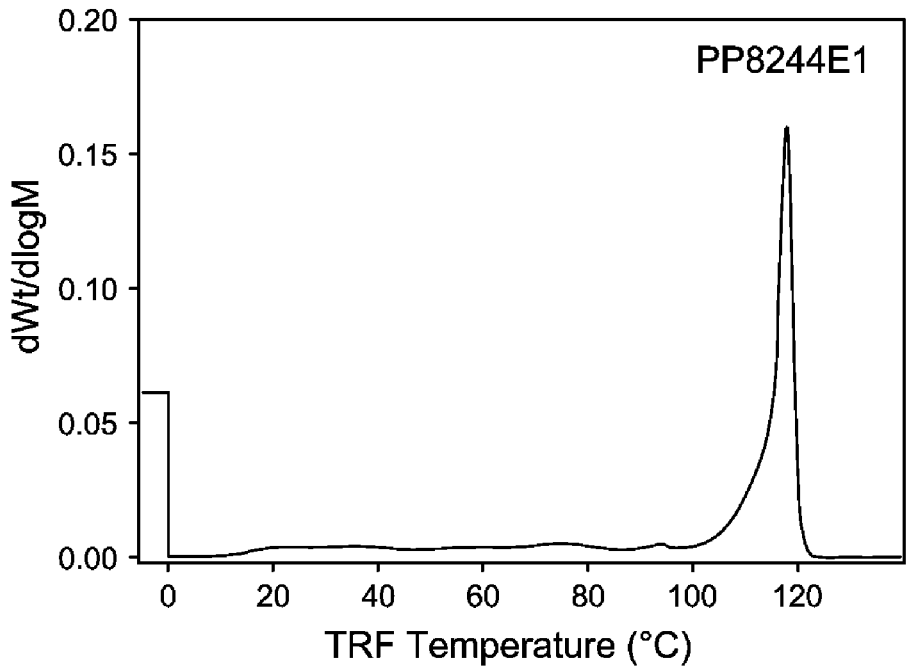
FIG. 6a is a qualitative TREF trace of ExxonMobil P8244 impact copolymer in ortho-dichlorobenzene (oDCB), where the mass fraction is 23 wt % for a soluble phase (T<25° C.); 19% for crystallizable EP (T=25° C. to 95° C.) and 58 wt % for rest of polymer (T>95° C.).
Figure 6B:
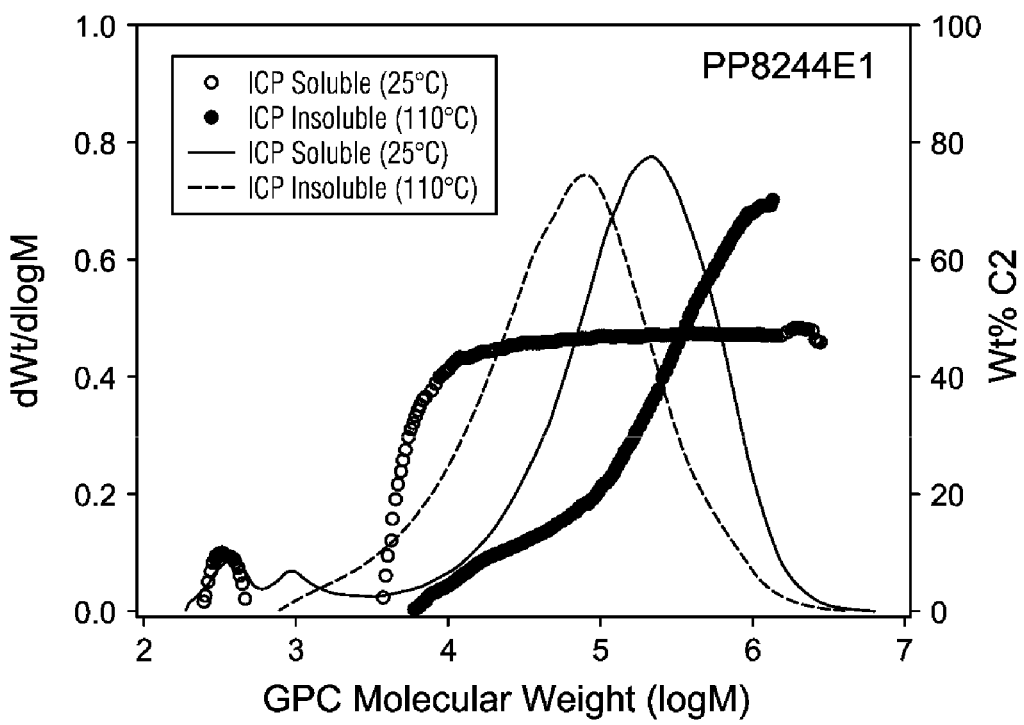
FIG. 6b is the GPC-4D molecular weight distribution (Mw/Mn) and C2% for soluble and insoluble phases of ExxonMobil P8244 impact copolymer ("ICP"), where the C2% is 45 wt % and uniform across molecular weight for the soluble phase while it reaches as high as 70 wt % at the high MW tail of the insoluble phase.

To demonstrate the existence of a PE phase, the insoluble phase (PE+PP) of one of the ExxonMobil PP8244E1 impact copolymer (ICP), an example of a multi-component polymer, was further fractionated at 110° C. (The choice of 110° C. was based on TREF data shown in FIG. 6a so as to capture most of the PE phase but exclude PP phase as much as possible). The GPC-4D chromatograms for the soluble portion at 110° C. from the insoluble phase of 25° C. are shown in FIG. 6b together with the soluble phase at 25° C. It can be seen that the C2% content can be as high as 70 wt % at high MW end for the 110° C. fraction, which indicates that components with high C2% content such as ethylene rich EP or homo PE exist in the insoluble phase of 25° C.

Any of the independently claimed embodiments herein may also be further described by any one or more of the following numbered paragraphs:

P1. Wherein the MCP comprises at least two polymer components, and wherein the at least two components are not physically separated from the polyolefin prior to elution.

P2. Wherein the MCP comprises an ethylene-propylene copolymer having within the range from 5 wt % to 60 wt % ethylene-derived units by weight of the copolymer.

P3. Wherein the MCP has an ethylene-propylene copolymer content within the range from 10 wt % to 50 wt % by weight of the MCP.

P4. Wherein the IR absorptions are recorded electronically and a computing system is used to perform the calculations.

P5. A chromatographic system comprising at least one chromatographic column wherein at least one column has one or more detectors associated therewith such that the output is captured by a computing system comprising code to convert the output into at least the $C_{EP}$ and $EP_{C2}$ any of the independently claimed embodiments.

For all jurisdictions in which the doctrine of "incorporation by reference" applies, all of the test methods, patent publications, patents and reference articles are hereby incorporated by reference either in their entirety or for the relevant portion for which they are referenced.

The invention claimed is:

1. A method of analyzing a multi-component polymer, MCP comprising:
    a) dissolving a MCP having a primary monomer and primary comonomer in a vial to form a parent sample having a volume V1 comprising soluble polymer;
    b) injecting a portion of the V1 into a chromatographic column to get elution slices E1, leaving a volume V2 behind in the vial;
    c) filtering V2 to isolate MCP solids Mp;
    d) dissolving solids Mp to form solution V3;
    e) injecting a portion of V3 into the chromatographic column to get elution slices E3;
    f) obtaining IR spectra at wavelengths suitable for the primary monomer and the primary comonomer of E1 and E3, separately; and
    g) for each elution slice E1 and E3, separately determine:
        i) the different polymer components; and
        ii) the comonomer content of each component.

2. The method of claim 1, calculating the concentration of the soluble polymer in the solution of parent sample with the following formulae:
    1) calculate the apparent concentration of soluble phase ($C_{GPC}$) of V1 with the its mass recovery ($MR_{Solu}$) and assumed concentration ($M_0/V_0$) where $M_0$ is the assumed polymer mass in solution and $V_0$ is the volume amount of solvent into the vial:

$$C_{GPC} = \frac{M_0}{V_0} MR_{Solu}$$

2) prorate the apparent concentration to the actual concentration:

$$C_{Solu} = \frac{V_{Sample2} + V_0}{V_{Sample2}} C_{GPC} = \left(1 + \frac{DV_0}{M_{Solu}}\right) \frac{M_0}{V_0} MR_{Solu};$$

3) calculate the mass ratio of soluble phase (EP+aPP) in the MCP, where the MCP has a concentration $C_{MCP}$;

$$R_{Solu} = \frac{C_{Solu}}{C_{MCP}} = \left(1 + \frac{DV_0}{M_{Solu}}\right) \frac{M_0}{V_0} \frac{MR_{Solu}}{C_{MCP}};$$

where "D" is solvent density and the MCP is assumed to be fully dissolved; or alternatively the $C_{MCP}$ can be determined with the similar procedure as $C_{Solu}$;

$$C_{MCP} = \left(1 + \frac{D^1 V_0}{{}^1 M_{MCP}}\right) \frac{{}^1 M_0}{{}^1 V_0} {}^1 MR_{MCP},$$

where the ${}^1M_0$, ${}^1V_0$, ${}^1M_{MCP}$, ${}^1MR_{MCP}$ in the first test are the counterparts for $M_0$, $V_0$, $M_{Solu}$ and $MR_{Solu}$ in the second test;

4) calculate the mass ratio of atactic polypropylene, aPP, rubbery ethylene-propylene EP, ethylene-based homopolymer, PE and isotactic polypropylene, iPP phase in MCP from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE}; \text{ and}$$

5) calculate the $C_{EP}$ and $EP_{C2}$ of MCP:

$$C_{EP} = 100 \times (R_{EP} + R_{PE}); \text{ and } EP_{C2} = 100 \times (C2\%_{MAP}/C_{EP}).$$

3. The method of claim 1, wherein the MCP comprises at least two polymer components, and wherein the at least two components are not physically separated from one another as part of the MCP prior to elution.

4. The method of claim 1, wherein the MCP comprises an ethylene-propylene copolymer having within the range from 5 wt % to 60 wt % ethylene-derived units by weight of the copolymer.

5. The method of claim 1, wherein the MCP has an ethylene-propylene copolymer content within the range from 10 wt % to 50 wt % by weight of the MCP.

6. The method of claim 1, wherein the IR absorptions are recorded electronically and a computing system is used to perform the calculations.

7. A chromatographic system comprising at least one chromatographic column wherein at least one column has one or more detectors associated therewith such that the output is captured by a computing system comprising code to convert the output into at least the $C_{EP}$ and $EP_{C2}$ of claim 2.

8. A method for determining the amount of various polymer components and the comonomer composition of each polymer component in multi-component polymer system when eluting the multi-component polymer through a chromatographic system comprising:

a) in a first test, adding volume $^1V_0$ of solvent to an amount $M_{MCP}$ of a solid MCP and dissolving to form an MCP solution;
b) withdrawing a volume $^1V_x$ from the MCP solution and injecting the volume into a chromatographic column;
c) replacing the amount of volume $^1V_x$ with solvent $^1V^{solv}$ in the MCP solution to form second volume $^2V_0$ of MCP solution;
d) measuring the Infrared (IR) absorption of at least the primary monomer-derived unit stretch frequency and the comonomer-derived unit in elution volume slices (Ve) to determine the concentration of the MCP ($^1C_{MCP}$) and the amount of comonomer;
e) determining the mass recovery ($MR_{MCP}$) by integrating the chromatogram over the full range of elution volume and comparing the integral area of the tested sample with the corresponding homopolymer from the primary monomer-derived unit;
f) determining the average comonomer content ($C2\%_{MCP}$) by integrating the chromatogram associated with the comonomer-derived unit and comparing its integral area with that for the primary monomer-derived unit;
g) allowing the second volume $^2V_0$ to cool to at least 25° C., followed by isolating the solids from $^2V_0$; collecting a remaining solution from the second volume containing EP and aPP;
h) determine the mass of the remaining solution ($M_{solu}$), forming the sample for a second test;
i) in a second test, adding volume $V_0$ of solvent to the amount $M_{solu}$ solution of the EP and aPP and dissolving;
j) in the second test, withdrawing a certain amount of solution containing the solution of the EP and aPP and injecting the volume $^1V_x$ into a chromatographic column;
k) measuring the Infrared (IR) absorption of at least the primary monomer-derived unit stretch frequency and the comonomer-derived unit in elution volume slices (Ve) so as to determine the concentration of the soluble ($C_{Solu}$) and the amount of comonomer ($S_{Solu}$);
l) determining the mass recovery ($MR_{Solu}$) by integrating the chromatogram (concentration vs. Ve) over the full range of elution volume and comparing the integral area of the tested sample with the corresponding homopolymer from the primary monomer-derived unit;
m) determining the average comonomer content ($C2\%_{Solu}$) by integrating the chromatogram associated with the comonomer-derived unit and comparing its integral area with that for the primary monomer-derived unit;
n) reselect integral limits by excluding the low MW peaks and determine the mass recovery ($MR_{EP}$) and average C2 content ($C2\%_{EP}$) for the remainder of the chromatograph; and
o) calculate the concentration of the soluble polymer in the solution of the EP and aPP with the following formulae:
1) calculate the apparent concentration of soluble phase with the mass recovery ($MR_{Solu}$) and assumed concentration ($M_0/V_0$), where $M_0$ is the assumed polymer mass in solution and $V_0$ is the volume amount of solvent added into the vial:

$$C_{GPC} = \frac{M_0}{V_0} MR_{Solu};$$

2) prorating the apparent concentration to the actual concentration:

$$C_{Solu} = \frac{V_{Sample2} + V_0}{V_{Sample2}} C_{GPC} = \left(1 + \frac{V_0 D}{M_{Solu}}\right) \frac{M_0}{V_0} MR_{Solu},$$

where "D" is the solvent density at 25° C.;
3) prorating the actual concentration of solution in sample 2 to that of sample 1:

$$C_{Solu\_1} = \frac{^2V_0}{^1V_0 - ^1V_x} C_{Solu} = \frac{^1V_0 - ^1V_x + ^1V^{Solv}}{^1V_0 - ^1V_x} C_{Solu},$$

4) calculate the mass ratio of soluble phase (EP+aPP) in MCP:

$$R_{Solu} = \frac{M_{EP+aPP}}{M_{MCP} MR_{MCP}} = \frac{^1V_0 C_{Solu\_1}}{M_{MCP} MR_{MCP}};$$

5) calculate the mass ratio of aPP, EP, PE and iPP phase in MCP from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE};\text{ and}$$

6) calculate the $C_{EP}$ and $EP_{C2}$ of MCP:

$C_{EP} = 100 \times (R_{EP} + R_{PE});$ and $EP_{C2} = 100 \times (C2\%_{MCP}/C_{EP})$.

9. A chromatographic system comprising at least one chromatographic column wherein at least one column has one or more detectors associated therewith such that the output is captured by a computing system comprising code to convert the output into at least the $C_{EP}$ and $EP_{C2}$ of claim 8.

10. A method for determining the amount of various components and the comonomer composition of an MCP or homopolyolefin when eluting the MCP or homopolyolefin through a chromatographic system, wherein the rubber content is very low, the method comprising:
a) two tests performed in parallel in which the samples used in both tests are dispensed from a parent solution of an MCP;
b) preparing a parent solution having concentration $C_{MCP} = M_{MCP}/V_{solvent}$ at least 2 mg/ml but below the level of precipitation and at a high enough temperature to dissolve all MCP solids, where the $M_{MCP}$ is the mass of MCP polymer added and $V_{solvent}$ is the volume of solvent added;
c) preparing a first and second test sample, the first test sample having a first mass of MCP solution $^1M_{MCP}$ while still heated;
d) allowing the second test sample to cool to at least 25° C., followed by isolating solids precipitated therefrom, where the solution contains mostly EP and aPP, where the mass of the solution ($M_{solu}$) forms the sample for the second test sample;

e) in the first sample, adding volume $^1V_0$ of solvent to the first sample $^1M_{MCP}$ dissolving the MCP at a high enough temperature to dissolve all MCP solid;
f) in the second sample, adding volume $V_0$ of solvent to the $M_{solu}$ solution of the EP and aPP, dissolving the polymer at any temperature above 20° C.;
g) measuring the Infrared (IR) absorption of at least the primary monomer-derived unit stretch frequency and the comonomer-derived unit in elution volume slices (Ve) of the first and second samples so as to determine the concentration of the polymer blend or soluble phase and the amount of comonomer;
h) determining the mass recovery by integrating the chromatogram over the full range of elution volumes for the first and second samples and comparing the integral area of the tested sample with the corresponding homopolymer from the primary monomer-derived unit;
i) determining the average comonomer content by integrating the chromatogram associated with the comonomer-derived unit and comparing its integral area with that for the primary monomer-derived unit;
j) measuring the mass recovery and average comonomer content for the first sample, the MCP solution ($^1MR_{MCP}$, $C2\%_{MCP}$), and for the second sample measure the soluble phase ($MR_{Solu}$, $C2\%_{Solu}$);
k) reselect integral limits by excluding the low MW portion for the soluble phase (aPP) and determine the mass recovery ($MR_{EP}$) and average comonomer content ($C2\%_{EP}$) for the remainder of the polymer; and
l) calculate the concentration of the soluble polymer in the solution of parent sample with the following formulae:
  1) calculate the apparent concentration of soluble phase with its mass recovery ($MR_{Solu}$) and assumed concentration ($M_0/V_0$) where $M_0$ is the assumed polymer mass in solution and $V_0$ is the volume amount of solvent added:

$$C_{GPC} = \frac{M_0}{V_0} MR_{Solu};$$

2) prorating the apparent concentration to the actual concentration:

$$C_{Solu} = \frac{V_{Sample2} + V_0}{V_{Sample2}} C_{GPC} = \left(1 + \frac{V_0 D}{M_{Solu}}\right)\frac{M_0}{V_0} MR_{Solu};$$

where "D" is solvent density;
  3) calculate the mass ratio of soluble phase (EP+aPP) in MCP:

$$R_{Solu} = \frac{C_{Solu}}{C_{MCP}} = \left(1 + \frac{DV_0}{M_{Solu}}\right)\frac{M_0}{V_0} \frac{MR_{Solu}}{C_{MCP}};$$

where the MCP is assumed to be fully dissolved; alternatively the $C_{MCP}$ can be determined with the similar procedure as $C_{Solu}$:

$$C_{ICP} = \left(1 + \frac{^1V_0 D}{^1M_{MCP}}\right)\frac{^1M_0}{^1V_0} {}^1MR_{MCP},$$

where the $^1M_0$, $^1V_0$, $^1M_{MCP}$, $^1MR_{MCP}$ in the first test are the counterparts for $M_0$, $V_0$, $M_{Solu}$ and $MR_{Solu}$ in the second test;
  4) calculate the mass ratio of aPP, EP, PE and iPP phase in MCP from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE}; \text{ and}$$

5) calculate the $C_{EP}$ and $EP_{C2}$ of MCP:

$$C_{EP} = 100 \times (R_{EP} + R_{PE}); \text{ and } EP_{C2} = 100 \times (C2\%_{MCP}/C_{EP}).$$

11. A chromatographic system comprising at least one chromatographic column wherein at least one column has one or more detectors associated therewith such that the output is captured by a computing system comprising code to convert the output into at least the $C_{EP}$ and $EP_{C2}$ of claim 10.

12. A method of analyzing the soluble component of an MCP when eluting the MCP through a chromatographic system comprising:
a) two tests performed in parallel in which the samples used in both test are dispensed from a parent solution of MCP;
b) prepare the parent solution concentration $C_{MCP} = M_{MCP}/V_{solvent}$ below the level of precipitation while at a high enough temperature to dissolve all MCP solids, where the $M_{MCP}$ is the mass of MCP polymer added and $V_{solvent}$ is the volume of solvent added;
c) prepare two samples, the first sample having a first mass of MCP solution $^1M_{MCP}$ while still heated;
d) allowing the second sample to cool to at least 25° C., followed by filtering solids precipitated therefrom, where the mass of the solution ($M_{solu}$) forms the sample for the second test;
e) in the first sample, adding volume $^1V_0$ of solvent to the first sample $^1M_{MCP}$ dissolving the MCP at a high enough temperature to dissolve all MCP solid;
f) in the second sample, adding volume $V_0$ of solvent to the $M_{solu}$ solution of the solubles, dissolving the polymer at any temperature above 20° C.;
g) measuring the Infrared (IR) absorption of at least the primary monomer-derived unit stretch frequency in elution volume slices (Ve) of the first and second samples so as to determine the concentration of the polymer blend or soluble phase;
h) determining the mass recovery by integrating the chromatogram over the full range of elution volumes for the first and second samples and comparing the integral area of the tested sample with the corresponding homopolymer from the primary monomer-derived unit;
i) measuring the mass recovery for the first sample, the MCP solution ($^1MR_{MCP}$), and for the second sample, the soluble phase ($MR_{Solu}$); and
j) calculate the concentration of the soluble polymer in the solution of parent sample with the following formulae:
  1) calculate the apparent concentration of soluble phase with the its mass recovery ($MR_{Solu}$) and assumed concentration ($M_0/V_0$) where $M_0$ is the assumed polymer mass in solution and $V_0$ is the volume amount of solvent added:

$$C_{GPC} = \frac{M_0}{V_0} MR_{Solu};$$

2) prorating the apparent concentration to the actual concentration:

$$C_{Solu} = \frac{V_{Sample2} + V_0}{V_{Sample2}} C_{GPC} = \left(1 + \frac{V_0 D}{M_{Solu}}\right) \frac{M_0}{V_0} MR_{Solu};$$

where "D" is solvent density.

3) calculate the mass ratio of soluble phase in MCP:

$$R_{Solu} = \frac{C_{Solu}}{C_{MCP}} = \left(1 + \frac{DV_0}{M_{Solu}}\right) \frac{M_0}{V_0} \frac{MR_{Solu}}{C_{MCP}};$$

where the MCP is assumed to be fully dissolved; alternatively the $C_{MCP}$ can be determined with the similar procedure as $C_{Solu}$:

$$C_{MAP} = \left(1 + \frac{{}^1V_0 D}{{}^1M_{MCP}}\right) \frac{{}^1M_0}{{}^1V_0} MR_{MCP},$$

where the ${}^1M_0$, ${}^1V_0$, ${}^1M_{MCP}$, ${}^1MR_{MCP}$ in the first test are the counterparts for $M_0$, $V_0$, $M_{Solu}$ and $MR_{Solu}$ in the second test;

4) calculate the mass ratio of aPP, EP, PE and iPP phase in MCP from $R_{Solu}$:

$$R_{aPP} = \left(1 - \frac{MR_{EP}}{MR_{Solu}}\right) R_{Solu};$$

$$R_{EP} = R_{Solu} - R_{aPP};$$

$$R_{PE} = (C2\%_{MCP} - C2\%_{Solu} R_{Solu})/100;$$

$$R_{iPP} = 1 - R_{Solu} - R_{PE}; \text{ and}$$

5) calculate the $C_{EP}$ and $EP_{C2}$ of MCP:

$$C_{EP} = 100 \times (R_{EP} + R_{PE}); \text{ and } EP_{C2} = 100 \times (C2\%_{MCP}/C_{EP}).$$

13. A chromatographic system comprising at least one chromatographic column wherein at least one column has one or more detectors associated therewith such that the output is captured by a computing system comprising code to convert the output into at least the $C_{EP}$ and $EP_{C2}$ of claim 12.

\* \* \* \* \*